United States Patent [19]
Liong et al.

[11] Patent Number: 6,151,649
[45] Date of Patent: Nov. 21, 2000

[54] SYSTEM, APPARATUS, AND METHOD FOR AUTOMATIC NODE ISOLATING SCSI TERMINATOR SWITCH

[75] Inventors: Thomas Sing-Kiat Liong, San Jose; Hung Dinh, Union City; Jin-Lon Hon, Milpitas, all of Calif.

[73] Assignee: International Business Machines Corporation, Armonk, N.Y.

[21] Appl. No.: 09/211,207

[22] Filed: Dec. 13, 1998

[51] Int. Cl.⁷ .............................. G06F 13/00; G06F 13/40
[52] U.S. Cl. ........................................... 710/126; 710/103
[58] Field of Search ...................... 326/30; 710/100–104, 710/126–130

[56] References Cited

U.S. PATENT DOCUMENTS

| | | | |
|---|---|---|---|
| 5,272,396 | 12/1993 | Mammano et al. ...................... | 326/30 |
| 5,313,595 | 5/1994 | Lewis et al. ............................. | 710/126 |
| 5,338,979 | 8/1994 | Mammano et al. ...................... | 326/30 |
| 5,341,400 | 8/1994 | Davis ...................................... | 375/256 |
| 5,467,453 | 11/1995 | Kocis ...................................... | 710/101 |
| 5,521,528 | 5/1996 | Mammano et al. ...................... | 326/30 |
| 5,553,250 | 9/1996 | Miyagawa et al. ..................... | 710/129 |
| 5,586,271 | 12/1996 | Parrett ..................................... | 710/103 |
| 5,596,757 | 1/1997 | Smith ...................................... | 713/324 |
| 5,680,555 | 10/1997 | Bodo et al. ............................. | 710/126 |
| 5,706,447 | 1/1998 | Vivio ....................................... | 710/129 |
| 5,734,208 | 3/1998 | Jones ....................................... | 307/139 |
| 5,748,910 | 5/1998 | Herrera E. ............................... | 710/101 |
| 5,781,028 | 7/1998 | Decuir ...................................... | 326/30 |
| 5,919,252 | 7/1999 | Klein ....................................... | 710/100 |
| 5,920,266 | 7/1999 | Allgood et al. ..................... | 340/825.05 |
| 5,961,619 | 10/1999 | Voloshin ................................. | 710/101 |
| B2 5,272,396 | 11/1996 | Mammano et al. ...................... | 326/30 |
| B2 5,338,979 | 11/1996 | Mammano et al. ...................... | 326/30 |

*Primary Examiner*—Sumati Lefkowitz
*Attorney, Agent, or Firm*—Flehr Hohbach Test Albritton & Herbert

[57] ABSTRACT

System, apparatus, arid method for automatically detecting power-down, disconnection, or other failure of a SCSI bus connected device and isolating the SCSI node from the rest of the computer environment. Sensing a problem at the device node and substituting a buss termination circuit for the termination that had been provided by the device. Sensing the reconnection or power-up of a device at a SCSI bus mode and simultaneously reconnects the device's own terminator and removes the termination provided at disconnection. Particularly useful in clustered computer environments, such as for example, for data base server systems in which a plurality of server computers share a common data base comprised of one or more disk drives on a SCSI bus. Permits any of the servers to be disconnected from the clusters system or network and be repaired or replaced without powering-down or otherwise disabling the entire system or other devices on the system. One embodiment provides a switching circuit including a first input/output port having a plurality of first, port terminals, a second input/output port having a plurality of second port terminals, a terminator circuit having predetermined electrical characteristics, a reference voltage generator,. a voltage comparator circuit for comparing an externally provided first voltage with the reference voltage and for generating a switch control signal, and a switch for coupling the first port terminals to the terminator circuit and decoupling the first port terminals from the second port terminals to isolate the first port terminals from the second port terminals in response to receipt of a state of the switch control signal and for coupling the first port terminals to the second port terminals in response receipt of another state of the switch control signal.

15 Claims, 7 Drawing Sheets

SYSTEM, APPARATUS, AND METHOD FOR AUTOMATIC NODE ISOLATING SCSI TERMINATOR SWITCH

FIELD OF THE INVENTION

This invention pertains generally to computer systems and devices and the manner in which computer devices such as disk drives may be connected to a computer system using an SCSI bus architecture, and more particularly to systems, apparatus, and method for isolating a SCSI node from other nodes and from the remainder of a clustered system.

BACKGROUND OF THE INVENTION

In a clustered computing system, such as for example the clustered computing system 101 illustrated in FIG. 1 having two (or more) host computer system 104, 106 coupled via respective SCSI controllers 108, 110 and a Small Computer System Interface (SCSI) bus 112 to a common or shared disc drive box 114, it is advantageous be able to perform maintenance on one of the nodes 104, 106 without necessitating taking down the entire cluster, or subjecting the cluster to the possibility of failure as a result of removing or powering-down a node (for example node 2) while the other node (for example, node 1) is still operating on the bus 112. This powered-on removal of a component (node) or addition of a component (node) from the SCSI bus is referred to as "hot-plugging" or "hot-unplugging". In this example, we refer to the two hosts or nodes to a drive box 114 containing one or a plurality of hard disk drives 118 (118a, 118b, 118c) such as for example a RAID disk array within a SAF-TE enclosure; however, nodes 104, 106 may be connected to SCSI bus supported devices other than disk drives or drive arrays. We note that hot-plugging, hot-unplugging, and hot-swapping may refer to connecting components to the SCSI bus on either the drive side (for example, plugging in the drive box 114 itself, or the individual disk drives 118) or on the node side (for example, the host system nodes 104, 106). Here, we are concerned primarily with hot-plugging the one of the host systems from the node side of the bus, where in conventional systems the node side is the side nearest the host system nodes, and the drive side is the side nearest the disk drive box 114.

The physical structure and communications protocol of the SCSI bus, particularly relative to the first or SCSI-1 protocol (but also including SCSI-2, SCSI-3, SPI-2, and other present and anticipated future variants of SCSI) developed substantially independent of any recognized need for hot-plugging components to the SCSI bus or removing SCSI components from the bus. It is known that proper operation of an SCSI bus and the components operating on the bus depends upon proper termination of the SCSI bus as described in the SCSI Standards specification. When proper termination is not provided, operation may be erratic at best, and typically attempts to operate a SCSI based cluster without proper termination at the nodes will frequently crash the entire clustered system.

In the exemplary clustered system of FIG. 1, it is noted that each of the node 104, 106 include a controller 108, 110 and that each of the controllers include electronic circuitry or other means to implement an appropriate SCSI termination 120, 122 for the end of the SCSI bus as it interfaces with a respective node 104, 106. While the particular manner in which SCSI bus termination is provided is not important, and for example the termination may be provided without the use of an explicit controller, it is important the termination be maintained for proper operation. With this in mind, it is clear that removal of a node (e.g. node 104), or its controller 108, would also remove the SCSI termination 120 and leave the entire cluster 101 susceptible to failure.

It is sometimes necessary to remove nodes, either because of an actual failure or problem with a component of the node, because normal maintenance is due, to upgrade the node or components within the node, or for other reasons. Frequently, the equipment at each node (such as the host computer systems 104, 106) are provided in the form of a Field-Replaceable Unit (FRU) to permit relatively rapid removal and/or replacement with minimum or zero down time. These FRUs are intended to be hot-plugged, hot unplugged, or hot-swapped. Note that the term "hot-swapped" typically is used to denote the removal of one device and its replacement by another, while hot-plugged may in some contexts refer to the addition of a device that had not been present just prior to that addition, or removal of a device without the connection of a replacement. We use the terms interchangeably here, and provide additional clarification if the distinction is relevant to the particular description or use of the term.

While device hot-plugging is currently used in many conventional computer systems, such conventional use is not without problems. When a FRU is hot-plugged to an SCSI bus, there is a strong likelihood that either the overall cluster system 101 will crash (that is, for example, the system may hang, fail, or go into some other non-operational state), that one or more of the remaining node or nodes will experience problems or hang, or that other problems, particularly problems associated with communicating data from the drive box 114 by remaining nodes, will occur.

Therefore is desirable to provide some degree of isolation of such nodes, whether in the form of a Field-Replaceable Unit (FRU) or not, from the rest of the system in the event that the node or FRU is removed from or added to the cluster 101, to avoid the undesirable effects of hot-plugging onto an active system or the undesirability of downing the cluster or remaining nodes for maintenance. In the remainder of this description, we will refer to nodes, such as host systems 104, 106 or the controllers 108, 110 within as an FRU, with the understanding that the important factor is the location of the SCSI terminator 120, 122 within the node or FRU, and independent of whether the node would actually be classified as a Field-Replaceable unit.

One conventional approach to providing some limited degree of isolation in instances where an FRU 104, 106 is added or removed from the cluster 101, has been the provision of an SCSI repeater 132, 134 between the FRU (for example node 104) and the rest of the clustered system (for example, node 106 and drive box 114), such as is illustrated in FIG. 2. In this example, a SCSI repeater 132, 134 is provided between each of the FRUs 104, 106 and the shared drive box 114.

Unfortunately, even with this SCSI repeater 132, 134 approach, the FRU SCSI bus segment 136 is not isolated from the System SCSI Bus Segment 138 on the other side of SCSI repeater 132 or the remainder of the cluster system 101 as a result of the normal operation of conventional SCSI repeaters. Any disturbance of the FRU SCSI bus segment 136 resulting from removal of FRU 104 or the absence of the FRU 104 from the bus will be transmitted to the system SCSI Bus Segment side 138 of the SCSI bus since the function of the SCSI repeater 132 is to repeat any signal from one side (e.g. the FRU side 136) to the other side (e.g. the system side 138). While for actual signals it is desirable to reshape signal waveforms for retransmission, it is not desirable to reshape noise or other disturbance.

In spite of these limitations of the use of the SCSI repeater 132, 134 in this manner and its associated problems, the use of SCSI repeaters during node disconnection has continued but the applicability is typically limited to systems where the SCSI is in "quiet down" mode, that is, that for situations where activity on the SCSI bus has been stopped, and when so stopped, the system will not hang. Unfortunately, since the system activity on the SCSI bus must be stopped, the system is not usable during that time.

More recently, two-node clustering, such as the Microsoft™ Wolfpack™, has become popular in the fault-tolerant server environment. These two-node clusters use the SCSI bus as the back end I/O interface to achieve some measure of cluster system fault tolerance. While the SCSI bus is not the ideal interface for device or FRU hot-plugging or un-plugging; in maintaining fault-tolerance., some hot-plugging for system maintenance is highly desirable even though introduces other problems, and some degree of protection is better than none at all.

Therefore there remains a need for structure and method for replacing the SCSI bus termination at a system node when the system node or components thereof are added or removed, such as when hot-plugging or hot-unplugging an FRU, and for isolating the FRU SCSI bus segment from the remainder of the cluster during the modification itself and with the FRU removed from the cluster, while maintaining operation of the system while that node is down.

SUMMARY OF THE INVENTION

The invention provides system, apparatus, and method for automatically detecting the power-down, disconnection, or other failure of a SCSI bus connected device and the virtually instantaneous isolation of the SCSI node to which that device was connected from the rest of the computer environment. It does this in part by sensing a problem at the device node and substituting a termination circuit for the termination that had been provided by the device prior to disconnection, power-down or failure. The invention also senses the reconnection or power-up of a device at a SCSI bus mode and simultaneously reconnects the devices own terminator and removes the termination provided at disconnection.

The invention is particularly useful in clustered computer environments, such as for example, for data base server systems in which a plurality of server computers share a common data base comprised of one or more disk drives on a SCSI bus. The invention permits any of the servers to be disconnected from the clusters system or network and be repaired or replaced without powering-down or otherwise disabling the entire system or other devices on the system.

In one embodiment, the invention provides a termination switching circuit or unit including a first input/output port having a plurality of first port terminals, a second input/output port having a plurality of second port terminals, a terminator circuit having predetermined electrical characteristics, a reference voltage generator for generating a reference voltage, a voltage comparator circuit for comparing an externally provided first voltage with the reference voltage and for generating a switch control signal having a first state when the first voltage has a predetermined magnitude relationship relative to the reference voltage, and a multi-pole switch for coupling the first port terminals to the terminator circuit in response to receipt of the first state of the switch control signal and for coupling the first port terminals to the second port terminals in response receipt of another state of the switch control signal.

In another embodiment the invention includes a clustered system providing a terminator switching circuit between each of the server nodes and the other shared cluster system resources, such as hard disk drives storing information, or other servers.

In another embodiment, the invention provides method for automatically detecting a power-down condition on the SCSI or other bus or communication link, and automatically engaging a termination circuit to replace that lost at power-down or disconnect.

DETAILED DESCRIPTION OF EMBODIMENTS OF THE INVENTION

Figure 1:
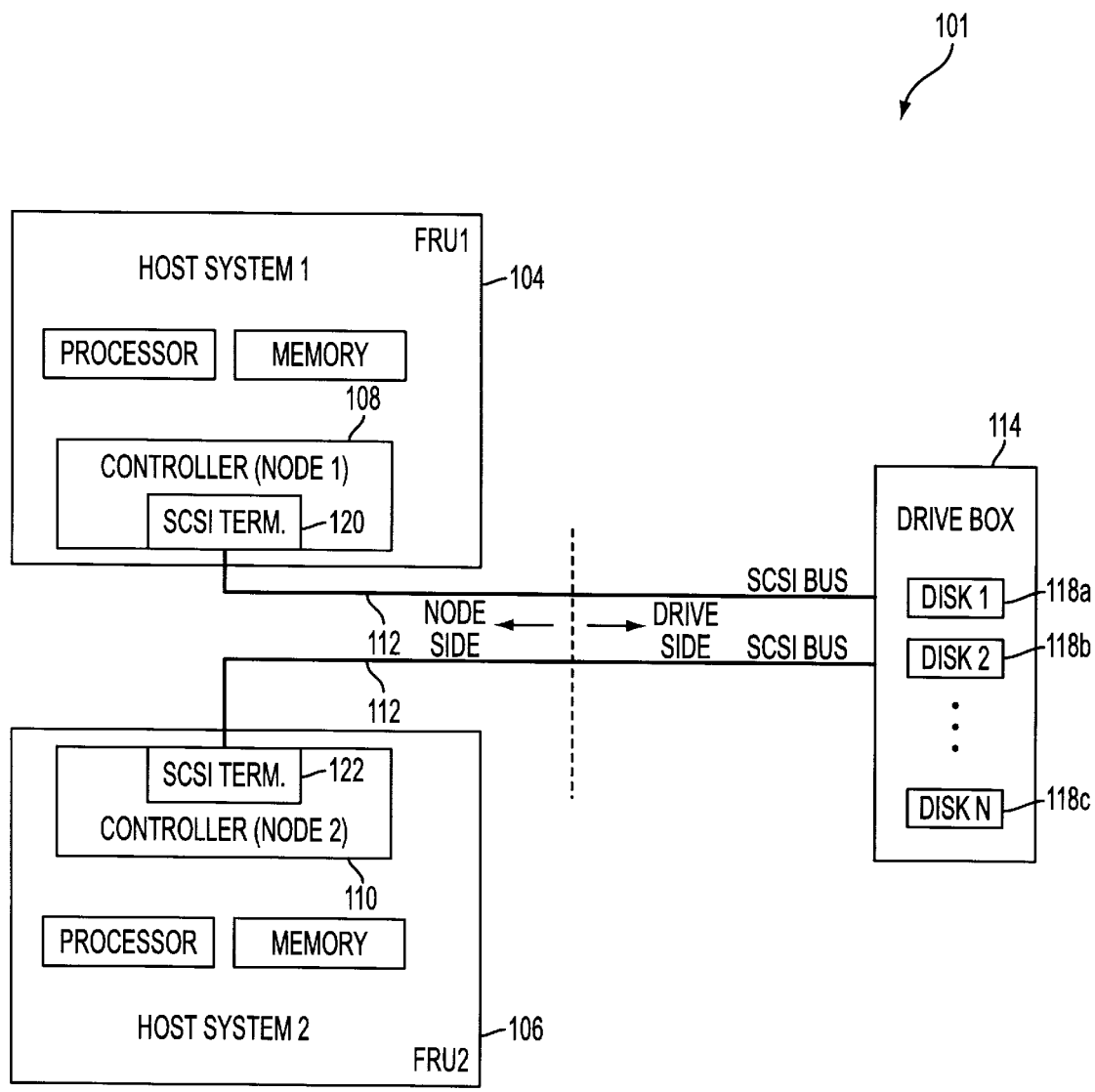
FIG. 1 is a diagrammatic illustration showing a conventional two-node clustered computer system with direct connection of the two nodes to a shared disk drive box providing no hot-plugging isolation.
Figure 2:
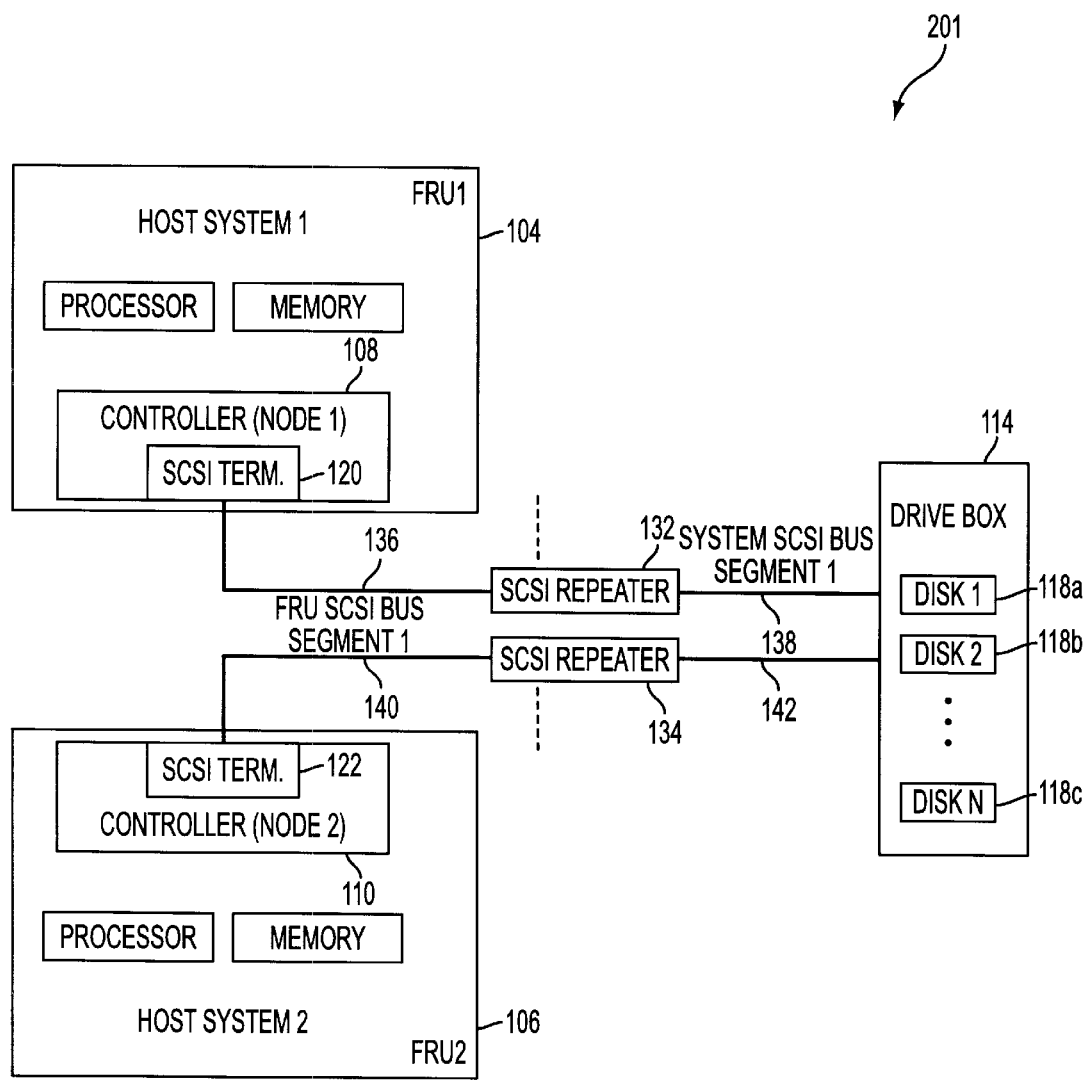
FIG. 2 is a diagrammatic illustration showing a conventional two-node clustered computer system with SCSI repeaters interposed along the SCSI bus in an attempt to isolate the two nodes from each other.
Figure 3:
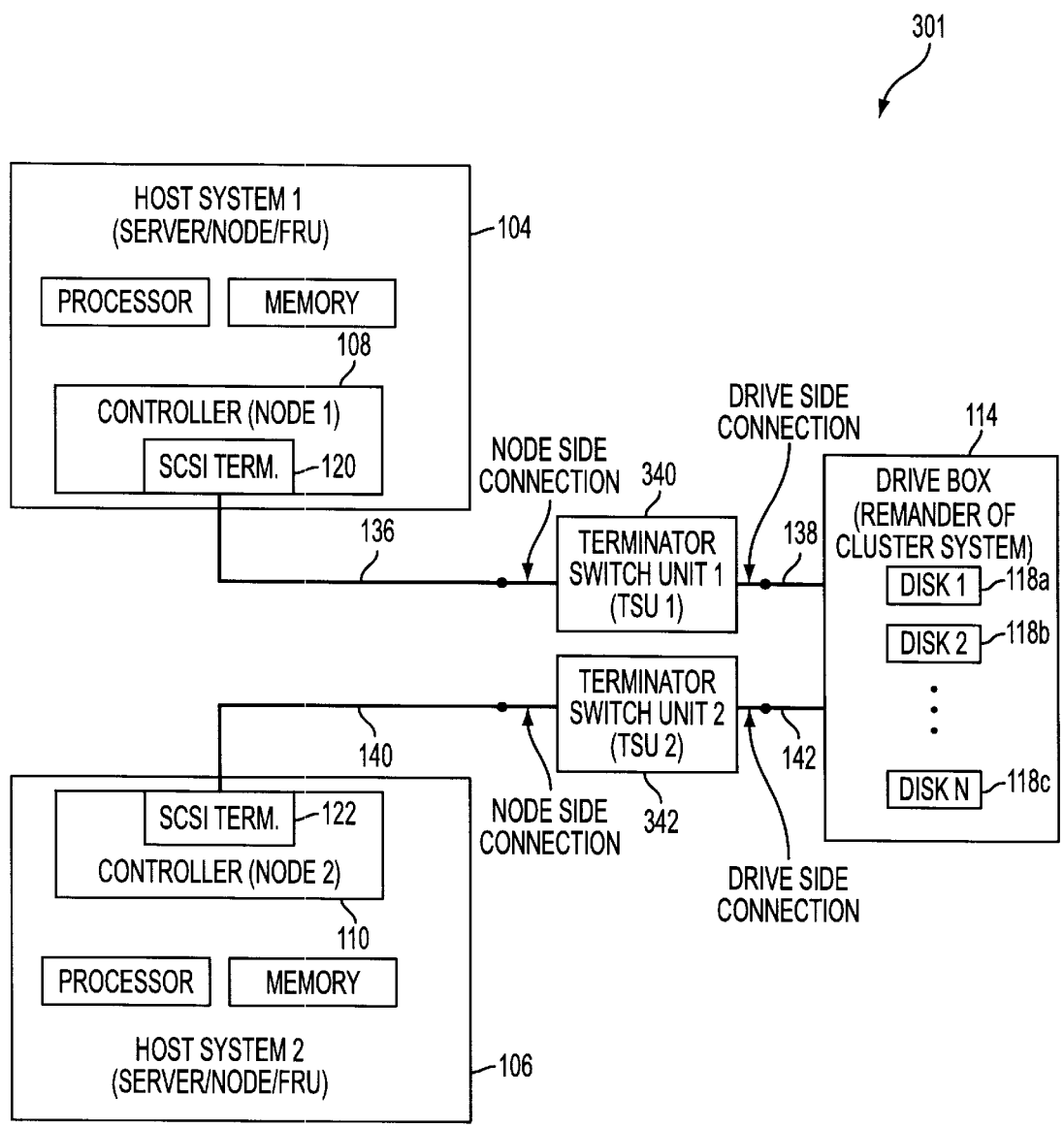
FIG. 3 is a diagrammatic illustration showing an embodiment of the inventive structure having two server nodes coupled to a drive box representing the remainder of the cluster system environment and providing a terminator switching unit between each server node and the disk box.

The inventive structure and method are now described relative to an exemplary two-node embodiment of a clustered system 301 shown in FIG. 3, an which provide a termination switch unit 340, 342 between each of the system nodes 104, 106 and the drive side drive box 114. The terminator switch units 340, 342 effectively isolates a node (the "down" node), such as one of FRU 104, 106 from the rest of the cluster 301 so that the system node or FRU 104, 106, may be removed, added, replaced, or serviced without causing failure or other SCSI termination related problems of the clustered system 301 or other the remaining node or nodes 104, 106 thereby improving the serviceability of a node in a clustering environment.

In operation, the inventive terminal switch unit (TSU) 340, 342 automatically detects the FRU supplied term power (voltage) dropping below 3.55–3.6 volt range at a FRU node 104, 106 and isolates that node from the rest of the clustering system 301. At the same time that terminator switch 340, 342 detects the drop in power (voltage) at the node, the terminator switch replaces (within about 5 nanoseconds) the termination needed by the SCSI bus on the node side of the TSU, which termination had up to that instant been provided by SCSI terminator 120, 122 within the removed or failed node. In one embodiment, the switching delay is about 20 microseconds and the switching speed is about 5 nanoseconds.

Those workers having ordinary skill in the art will appreciate in light of th description provided herein, that smaller switching delay and faster switching speed are desirable;

however, the invention is not limited to the exemplary approximately 20 μsec switching delay, or to the exemplary approximately 5 nsec switching speed, but that longer and shorter times for each are within the scope of the invention. For example, but not by way of limitation, switching delay may be in the range of from about 100 μsec to 1 μsec, and switching speed in the range of from about 1 nsec to about 50 nsec. The switching delay refers to the elapsed period of time between detection of term power voltage decrease for the comparator to react and send signals to the SCSI terminator and the electronic switches. The 5 nanosecond switching time refers to the period of time it actually takes the switching action in the electronic switch to occur. It is advantageous to have a fast switching speed to reduce the amount of time that the SCSI is in an unterminated condition.

When the node FRU 104, 106 has been serviced (or replaced) and the node is powered up, terminator switch 340, 342 will again automatically detect the existence of the node and restore the connection between the newly brought up (powered-up) node to the rest of the clustering system 301. Again at that instant, terminator switch 340, 342 will disable its internal SCSI termination. In this manner, the newly connected node will provide termination of the SCSI bus. The manner in which this is accomplished is described relative to the exemplary embodiments in FIG. 3, and FIGS. 4–6 hereinafter.

Those workers having ordinary skill in the art will appreciate that maintaining proper termination of the bus is important because having proper termination on the SCSI bus will eliminate or reduce the amount of undesirable signal reflection which causes the SSI signal to degrade. Therefore, the switching speed is important to maintain the SCSI bus fully terminated while switching is taking place.

The inventive structure and method employ an electronic switch 344 (e.g. a silicon semiconductor switch) having two effective switching actions to isolate the System SCSI bus segment 138 and the remaining cluster 301 from the FRU SCSI Bus segment 136 and from the associated FRU itself. Switch 344 having two actions may also be thought of as two separate switches here referred to as switch SW1 344a and switch SW2 344b whether implemented by a single circuit or switch or by two separate circuits or switches.

Figure 4:
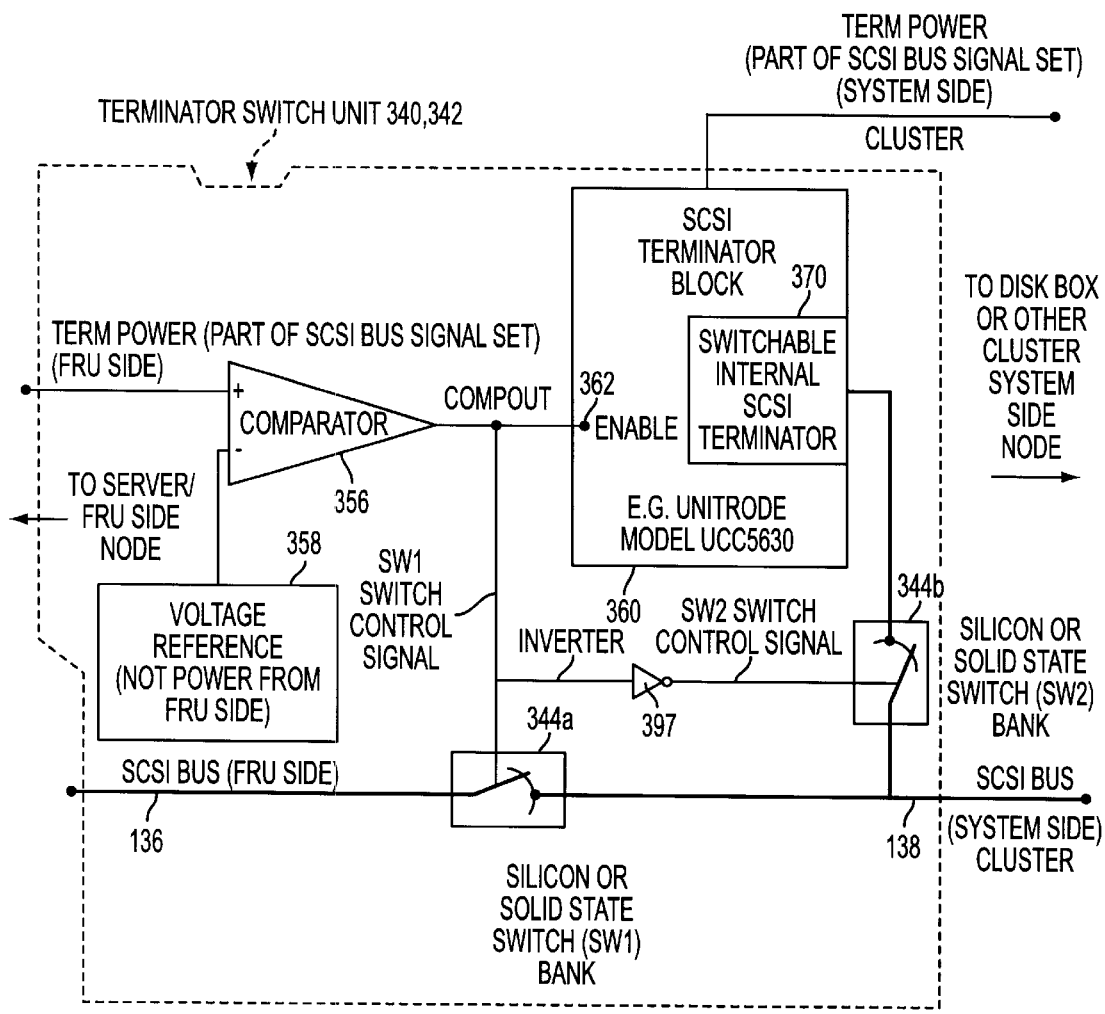
FIG. 4 is a diagrammatic illustration showing a first embodiment of the inventive terminator switch unit (TSU).
Figure 5:
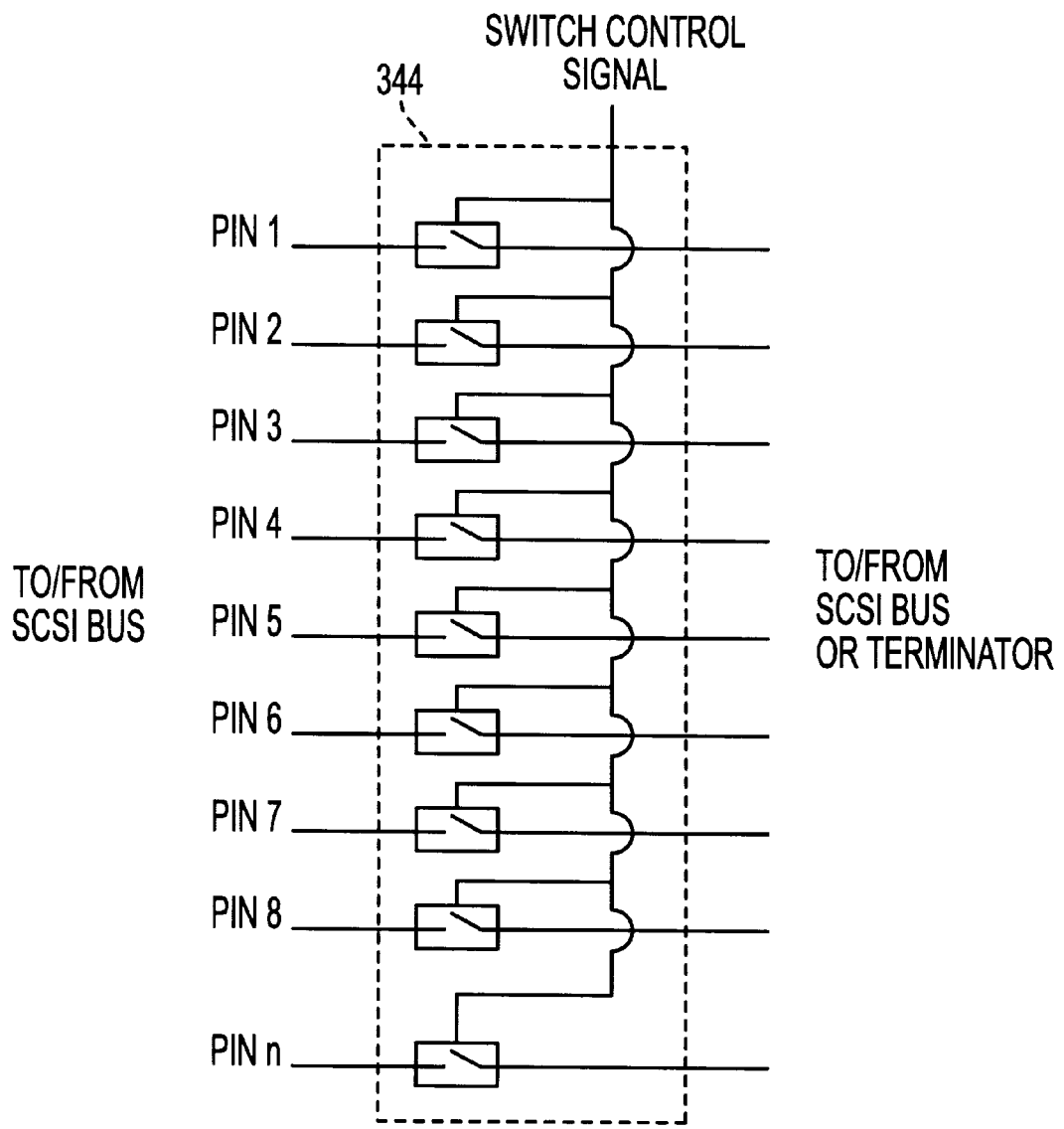
FIG. 5 is a diagrammatic illustration showing an embodiment of the use of silicon or other solid state electronics switches for each SCSI bus line in the terminator switch unit.

With respect to the exemplary embodiment in FIG. 4, term power is provided at pin__17, pin__19, pin__51, and pin52 of the 68-pin type SCSI connector of the FRU (node) side. The same pin connections are provided on the Drive Box side connector. The term power on the FRU (node) side is separated from the term power on the drive side. The term power supplied by the drive side (Or the rest of the clustered system) is needed to provide power to the internal SCSI termination logic inside the TSU while the term power on the FRU side is going down. Therefore, it is important to have to decouple the term power between the FRU and the drive side in order to have the TSU work as intended.

Therefore, while separate lines are used in the Figures to depict the term power signal(s) and the rest of the SCSI bus signals, it should be understood that the SCSI bus includes a plurality of separate wires or pairs of wires, and that the term power is provided by a subset of these wires. The remaining individual bus wires, wire pairs, and/or signals are known from the SCSI standards in place in December 1998 and not shown or described further. Therefore, it is understood that term power is communicated over the SCSI bus itself and that a separate source is not required for operation of this embodiment of the inventive structure.

We now describe the structure and operation of one embodiment of the inventive terminator switch unit 340 structure relative to the diagrammatic illustration in FIG. 4. This description assumes that an FRU 104 is connected to the FRU side of TSU 340 and that the system side is connected to a disk drive box including one or more disk drives and to the other node 106 via a SCSI bus which is terminated in FRU 104 and node 106 prior to FRU 104 removal. Upon removal of FRU 104 from the bus, such as by removing the SCSI connector, powering down FRU 104, removing controller 108 from FRU 104, or otherwise causing the term power line voltage to drop relative to a reference voltage generated by reference voltage circuit 358, comparator 356 senses the drop in term power voltage from the FRU side and communicates this voltage drop to electronic switch 344a with a switch control signal to switch SW1 and to an input enable line 362 of SCSI terminator block 360. The comparator 356 provides a second switch control signal (nominally an inverted SW1 control signal generated from the SW1 control signal by inverter 397) to switch SW2 so that switches SW1 and SW2 open and close with opposite polarity. It is noted that each of switches SW1 and SW2 are actually a plurality of switches as each or the plurality of switches is responsible for simultaneously switching one line of the SCSI bus. For example, if there are 68 SCSI lines then each of switch SW1 and SW2 will have 67 individual switches (normally ground, the 68th line is not switched).

Figure 6:
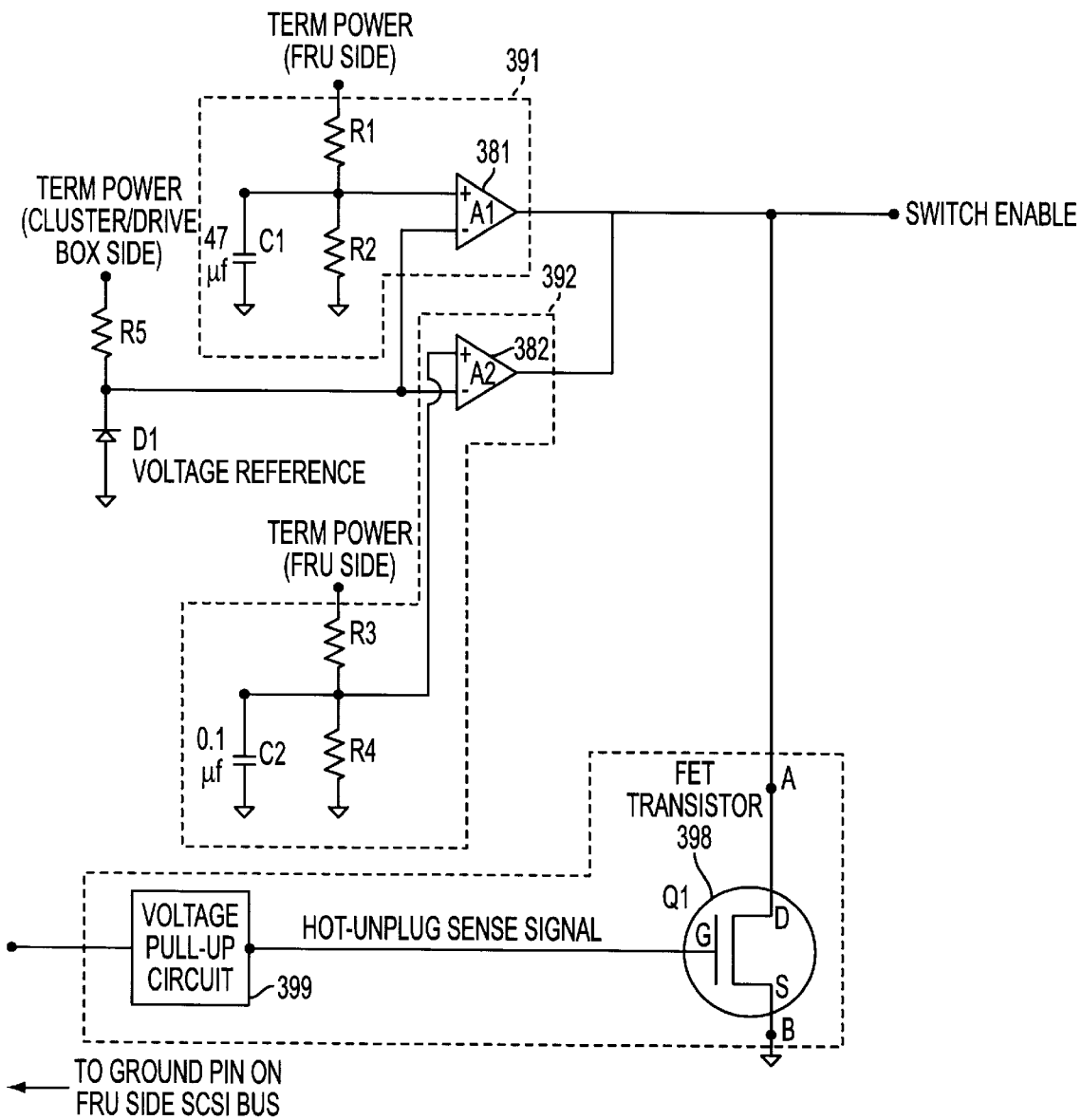
FIG. 6 is a diagrammatic illustration showing a second embodiment of the inventive terminator switch unit (TSU).

Comparator 356 and voltage reference circuit 358 may be implemented in a variety of ways as is known in the art for generating reference voltages and for comparing a reference voltage with a second input voltage. Exemplary embodiments of such circuits are also illustrated in the embodiment of FIG. 6. SCSI terminator block may generally be any SCSI terminator that can be switched into or out of the TSU circuit in the manner described. For example, either passive or active circuit type terminators may be used generally; but for Fast and Ultra speed SCSI configurations, an active termination is required by SCSI. In one exemplary embodiment of the invention, a Low Voltage Differential (LVD/SE) SCSI 9 Line terminator Model No. UCC5630 manufactured by Unitrode is advantageously used, but other active terminators may alternatively be used. A data sheet for the Unitrode UCC5630 is provided as Appendix I, and some operational principles and additional structural characteristics of circuits such as the UCC5630 are described in U.S. Pat. Nos. 5,521,528; 5,338,979 and its associated Reexamination Certificate B2 U.S. Pat. No. 5,338,979; and U.S. Pat. No. 5,272,396 and its associated Reexamination Certificate B2 U.S. Pat. No. 5,272,396; each of which are hereby incorporated by reference. However, it should be understood that any circuit that provides SCSI termination in the manner described may be used as the SCSI Terminator Block and that the invention is not limited to structures or methods that use either the UCC5630 circuit or incorporate the technology described in the afore referenced patents.

Comparator 356 outputs a switching terminator activate signal to activate the switching of the terminator and isolate the SCSI bus from the downed server node. The voltage reference is used to provide a stable and constant reference voltage for the comparator. Since the voltage reference is powered by the term power from the drive side (clustered system side), the referee voltage will not be affected when the node side is powered down. Therefore, a constant reference can be achieved and the comparator can constantly monitor the term power of the server node side against the voltage reference in determining if the power if the server is going down. When the FRU side term power signal is greater than or equal to the reference voltage the bus connection is maintained, but when it drops below some predetermined threshold voltage the switches are activated bus terminated by the TSU.

The comparator 356 output signal COMPOUT is communicated to electronic switch SWI 344a and acts as a first switch control signal to OPEN the SCSI bus in response to the detected drop in FRU side term power voltage. Comparator 356 output signal COMPOUT is also supplied as a control or enable signal to SCSI terminator block 360. In one embodiment of the invention, SCSI terminator block 360 is implemented using the Unitrode UCC5630 circuit and the comparator output signal COMPOUT is coupled to the enable input pin of that circuit. SCSI Terminator block 360 provides the appropriate SCSI termination to the cluster system side of TSU 340, so that the switched disconnection of the FRU bus is coupled to a switched connection of an SCSI terminator to the cluster/drive box side of the bus. When the UCC5630 circuit is uses, the SCSI terminator is provided internal to the UCC5630 circuit itself and provides a multimode low voltage differential and single-ended termination.

Electronic switches (SW1 and SW2) 344a, 344b may be implemented using FET transistor switches, such as for example, FET switch Model QS32XR861 made by Quality Semiconductor. For a three terminal FET switch having source (S), drain (D), and gate (G) terminals, application of a high (e.g. 5 volt) signal to the gate terminal will result in closing the circuit between the source and drain terminals effectively closing the switch, while a low voltage (or a negative voltage) applied to the gate terminal will open the switch. The output of the comparator 356 may be designed to operate switches SW1 and SW2 in the desired complementary manner so that one switch is open (to disconnect the FRU from the bus) and the other switch is closed to engage the internal SCSI terminator 370 within SCSI terminator block 360. Appropriate inverter circuits or the like may be employed to control the enable, not-enable control signals to the two sets of switches.

In one embodiment of the invention, all SCSI signals on the SCSI bus are switched except the ground signal. However, other embodiments of the invention may switch fewer of the lines if such lines are not used for signals or they do not affect termination or isolation. Therefore, one electronic switch is provided for each SCSI signal line (except ground). An electronic switch, particularly a silicon FET switch such as the switches made by Quality Semiconductor (Model No. QS32XR861) have a very low resistance when connected (closed) and a very high impedance when disconnected (open), for example the individual switches within the QS32XR861 have a resistance of about 5 ohms when connected and a propagation delay of only about 0.25 nanoseconds. The exemplary QS32XR861 switch unit is fabricated having twenty internal switching elements, and three such units are advantageously used for a 68-pin SCSI type bus. Desirably, all of the enable/disable pins for the SCSI bus switches are connected together for simultaneous switching. An embodiment of one of the switch banks SW1 or SW2 is illustrated in the diagramatic illustration of FIG. 5. It is understood that whether the signals come from or are communicated to the FRU side SCSI bus, the drive box side SCSI bus, or the internal terminator 370 within SCSI terminator block 360 depends on whether the switch is used for the SW1 or SW2 and its open or closed state. The enable/disable pin on the switches are controlled by the output of the conparator (See FIG. 4).

We note that the Field-Effect Transistor (FET) switch is advantageously used as the switching is accomplished in a fast and efficient manner of all SCSI lines simultaneously, whereas a manual switch would not provide the clean switching characteristics. In fact, the FET term power, reserve, and switches act to switch all SCSI lines (except term power, reserve, and ground) substantially simultaneously with a unplugging of the FRU side connector (or power down of the FRU) thereby minimizing the time that the SCSI bus is unterminated and therefore reducing the possibility of SCSI bus or cluster system failure or hang-up. While the switch timing relationship described here is sufficient for operation, it is preferred that the timing of switch action between the opening of SW1 344a and the closing of SW2 344b, be coordinated more precisely as may be accomplished with a variation of the comparator circuit 356 and voltage reference circuit 358 in the FIG. 6 embodiment.

In the FIG. 6 embodiment, a first amplifier/comparator circuit 391 receives the FRU side term power signal through a resistive-capacitive voltage divider circuit 395 including resistors R1 and R2 and capacitor C1 (47 microFarad) and presents a voltage to the non-inverting input of a comparator (for example implemented as an operational amplifier). The inverting terminal receives a reference voltage generated by the a reference voltage generator circuit connected through resistor R5 and diode D1. The voltage divider and capacitor network on the first comparator 391 is adjusted to react to power-up more slowly than the node/server side power ramp up. The large capacitor on the network essentially slowing down the ramp up on the TSU so that the detection by the comparator of power coming back up lags from the server/node side. The server/node side SCSI termination is therefore ready when the TSU's comparator detects power coming back up and switches the SCSI line to be terminated to the server/node side again.

A second comparator circuit 392, also receives the reference voltage at its inverting terminal, and its non-inverting input from a second resistive-capacitive circuit voltage divider circuit 396 including resistors R3 and R4 and capacitor C2 (0.1 microFarad) presents a voltage to the non-inverting input of a comparator. The second voltage divider and capacitor network on the second comparator is adjusted to react to power down more quickly than the first comparator that has a large capacitor so that it will switch the SCSI bus and provide termination accordingly before the server/node tennination ceased to function due to power going down.

The switches SW1 and SW2 work with opposite polarity. If the SW1 is connected (closed) than the SW2 is disconnected (open), and vice versa. When SW1 is connected and SW2 disconnected, the SCSI bus is passed through the switch to the server/node at the other end, therefore, termination is provided by the server/node it is connected to at the time. When SWI is disconnected (power down was detected on the server/node), the SCSI bus is isolated from the remainder of the clustered system. In this case, SW2 is connected (closed) and provides the SCSI termination required so that the clustered system will continue to operate normally as if no interruption occurred form the standpoint of the other server/node points of view. There is no requirement to quiet down the bus as may be required when conventional repeaters are used to attempt isolation of a downed node.

A hot-unplug sense control circuit is optionally supplied to provide a faster response to a hot-unplug of the FRU than the comparator circuits 391, 392 may be able to provide.

When an FRU node (e.g server node) is unplugged from the SCSI bus, the ground-pin signal from the FRU side SCSI bus is coupled to the gate terminal of a FET transistor switch 398 via a voltage pull-up circuit 399. FET 398 is used to switch witches SW1 and SW2 simultaneously with any FRU side SCSI cable disconnection or hot-unplug without the (short) delay that may accompany operation of comparator circuits 391, 392 and thereby reduce the time that the SCSI bus is unterminated even further than that provided by the operation of the comparators and switches SW1 and SW2 even further. In this way the internal SCSI terminator is immediately switched in to substitute for the FRU termination.

One advantageous feature of the inventive structure and method is the true isolation provided. By using the silicon switches and terminator switch unit as described, the downed node is truly isolated from the remainder of the clustered system. Without such isolation, the rest of the clustered system might be affected by events on the downed node portion of the SCSI bus or by the mere lack of proper bus termination. With the isolation provided by the inventive structure and method, the downed node can be disconnected from the remainder of the clustered system without disturbing the SCSI bus line used by the other nodes. This facility, therefore permits the on-line replacement, true fault-tolerance, and non-stop or zero-down time operation, that is desired in a clustered system environment.

In one embodiment of the invention, the server/node and the drive box are required to supply term power independently to the TSU at least in part so that term power is completely decoupled relative to the FRU/server/node side and the drive box side. Complete decoupling is important for achieving th desired fault tolerance and non-stop operational capability.

In one embodiment of the invention, the clustered system I/O SCSI bus may be segmented to support long cable lengths. For such configurations, an SCSI repeater of conventional design may be provided at the drive box to each server node. In this manner, the cable length between the drive box and the server/node can be twice as long when the repeater is used as when it is not used. Recommended maximum cable lengths are specified in the SCSI Specifications and not described further here. The TSU is connected between the server/node to the drive box whether or not a repeater is provided, and since the TSU is used to isolate the server, the TSU is placed next to the server/node before the server is connected to the rest of the clustered system.

Figure 7:
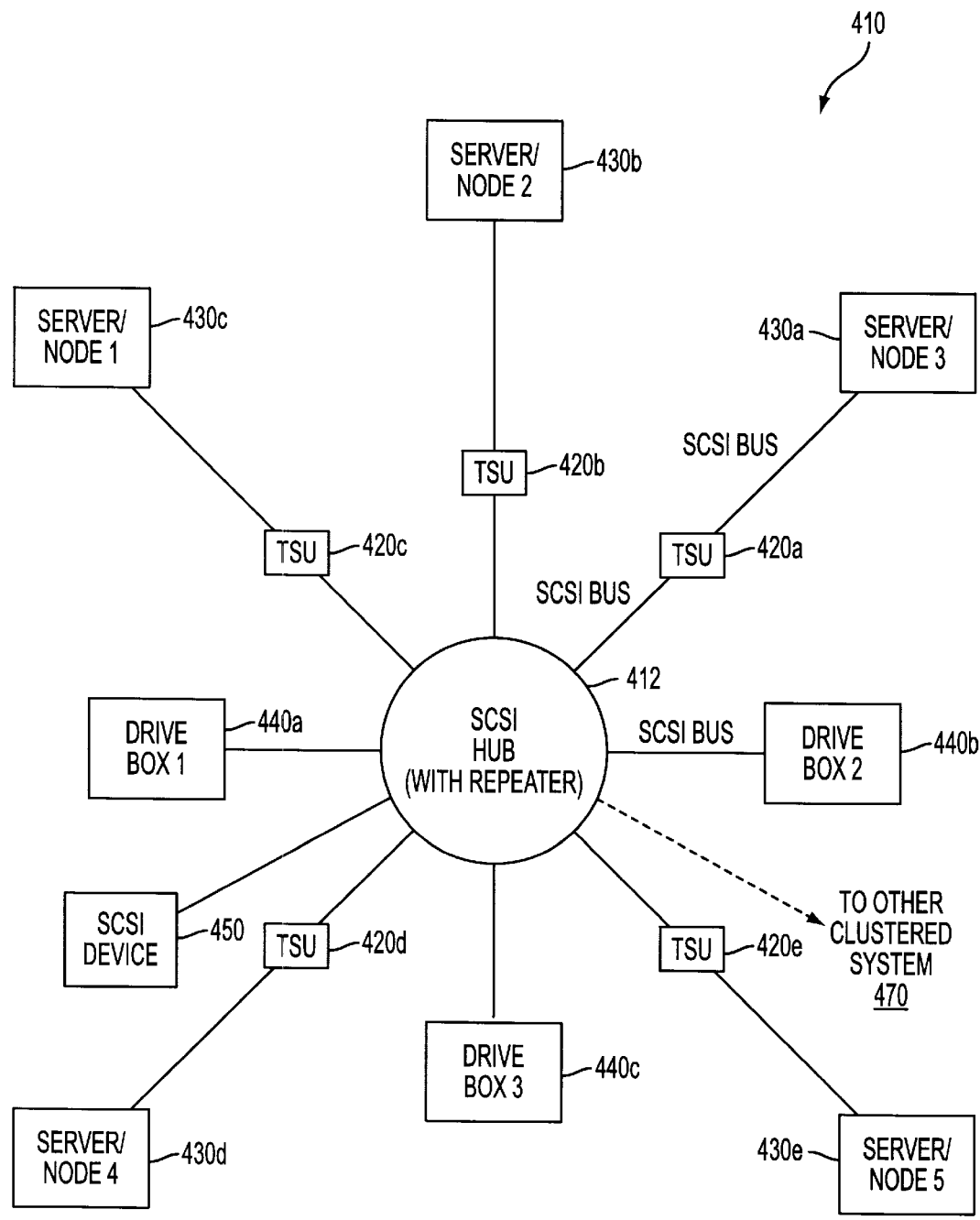
FIG. 7 is a diagrammatic illustration showing a star clustered multi-n ode embodiment of a the inventive system.

An alternative embodiment of the invention provides multiple clustered nodes system 410, where the nodes may be configured as a star configuration with an SCSI hub 412 in the center of the star as illustrated in FIG. 7. Each TSU 420 (420a, 420b, 420c, 420d, 420e) is placed after one of the server nodes 430 (430a, 430b, 430c, 430d, 430e) before it is connected to the SCSI hub 412. Other SCSI devices 450 such as drives or drive boxes 440 (440a, 440b, 440c) may also be connected to the hub up to the limit of devices supported by a single SCSI bus. Of course the clustered system may be extended by coupling the system 410, to another clustered system over an available SCSI bus to a second cluster system 470. In this manner, any server/node can be brought down for service without effecting the remainder of the clustered system.

It may be appreciated that the inventive structure and method provide numerous features and advantages over the prior-art. For example, the TSU provides termination on the SCSI bus and enable such termination automatically (based on a voltage drop) when the server or other node or FRU is down. The TSU provides total electrical signal isolation to the server/FRU when the Server/FRU looses power. Decoupling the SCSI term power in order to detect server being down without impacting the connectivity of the remainder of a clustered system. The manner in which the detection of power down may be delayed and yet providing for rapid detection of power up of the server/node that is being isolated. The provision of means for rapidly isolating a disconnected node (server or FRU) from the rest of a clustered system and for preventing the rest of the clustered system from being adversely affected when the server (node/FRU) is hot unplugged. The provision of means for detecting that a cable is being hot unplugged to determine that the cable being hot unplugged to determine that the server (server or node or FRU) is disconnected from the remainder of the system so that the TSU can isolate the broken SCSI bus from effecting the rest of the clustered system. The provision of structure and method the permit operation in two-node clustered system environment as well as multi-node or star clustered system environment. The use of electronic switches, such as silicon FETs, to effectively isolate the SCSI bus lines segment of the server (FRU/node) and to be able to closely mimic the "wire connectivity environment" (e.g. low resistance and short propagation delay) that works well in a SCSI Single-Ended (SE) and Low Voltage Differential (LVD) signaling environment. The use of two groups of electronic switches (e.g. semiconductor transistor, Gallium Arsenide or Silicon based transistors such as FETs) to isolate the SCSI bus segment of the downed server (FRU) and to engage or connect into the internal SCSI terminator to ensure that the SCSi bus is always terminated properly (except possibly for a nominal 5 nanosecond or less switching period), simultaneously and automatically based on circuit operation. The two groups of electronic switches are also used to reconnect the SCSI segment of the serviced server (FRU) and to disengage/disconnect the internal SCSI terminator to have the SCSI bus terminated at the server (FRU) side, simultaneously and automatically.

Advantageously, embodiments of the inventive structure and method provide automatic detection for Single-Ended (SE) or Low-Voltage Differential (LVD). No external power supply is required, and the invention provides both automatic-termination and bus isolation when the server node is down. Desirably, a device incorporating the inventive structure may be manufactured with a very small physical size. In one embodiment, the dimensions are about 2 inches×3 inches×0.75 inches (though smaller or larger sizes may be provided), and VHDIC (0.8 mm) type SCSI connectors are provided at both ends of the device, either with or without additional SCSI cabling. Of course those workers with ordinary skill in the art will appreciate in light of the description provided herein, that the invention is not limited to the particular physical size range, operating voltages, power consumption range, or other parameters that pertain specifically to one embodiment of the invention, and that these parameters are provided merely to illustrate a particular embodiment of the invention.

It will also be apparent to those workers having ordinary skill in the art in light of the description provided herein that although the inventive structure and method have been described in the context of a Small Computer System Interface (SCSI) bus and clustered system environment, that the invention itself is not limited to SCSI buses but rather that the inventive principles of detection disconnection of a component on a bus and rapidly substituting the disconnected components attributes by another circuit having comparable attributes is applicable to other bus configurations, communication links, and the like.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A Small Computer System Interface (SCSI) bus switching circuit comprising:
    a first SCSI input/output port having a plurality of first port terminals;
    a second SCSI input/output port having a plurality of second port terminals;
    a terminator circuit coupled to and receiving a termination power (TERM PWR) voltage from a first side of said bus and selectively providing electrical termination of said SCSI bus;
    a reference voltage generator for generating a reference voltage;
    a voltage comparator circuit for comparing a termination power (TERM PWR) voltage received over said SCSI bus from a first side of said SCSI bus with said reference voltage and for generating a switch control signal having a first state when said first voltage has a predetermined magnitude relationship relative to said reference voltage; and
    a multi-pole switch for coupling said first port terminals to said terminator circuit and decoupling said first port terminals from said second port terminals to isolate said first port terminals from said second port terminals in response to receipt of said first state of said switch control signal and for coupling said first port terminals to said second port terminals in response to receipt of another state of said switch control signal.

2. A buss switching circuit as in claim 1, wherein:
    said first input/output port comprises a Small Computer System Interface (SCSI) connector adapted to couple to a multi-line SCSI bus;
    said second input/output port comprises a SCSI connector adapted to couple to a multiline SCSI bus;
    said terminator circuit has electrical characteristics that provide electrical termination of said SCSI bus;
    said first voltage is the SCSI term power voltage received over said SCSI bus, said reference voltage is a voltage less than said SCSI term power standard SCSI compliant term voltage, and said voltage comparator circuit predetermined magnitude relationship is that said first voltage is a predetermined amount less than said reference voltage; and
    said multi-pole switch comprising a plurality of individual electronic transistor switches, each responsive to said switch control signal to couple one of said first port terminal lines of said multi-line SCSI bus to either said terminator circuit to automatically isolate said multi-line SCSI bus or said second port terminals.

3. A bus switching circuit as in claim 2, wherein: said multi-pole switch comprises a plurality of Field Effect Transistors (FETs) simultaneously responding to said switch control signal to switch in a period of time between about 1 nanosecond and 50 nanoseconds.

4. A bus switching circuit as in claim 2, wherein:
    said terminator switching circuit provides automatic termination on said SCSI bus when a SCSI device connected to said second input/output port loses power, is powered-down, or becomes disconnected from the SCSI bus.

5. A bus switching circuit as in claim 2, wherein: said second port is connected to a server node via said SCSI bus, said first input/output port is coupled to other SCSI devices, and said circuit provides complete electrical isolation of said server node from said other SCSI devices when said server node loses power, is powered-down, or becomes disconnected from the SCSI bus.

6. A clustered computer system comprising:
    a first computer;
    a second computer;
    a plurality of disk drives storing data;
    a Small Computer System Interface (SCSI) bus coupling a plurality of port terminals at each of said first computer, said second computer, and said plurality of disk drives; and
    a bus switching circuit interposed on said SCSI bus between said first computer and said plurality of disk drives for automatically terminating said SCSI bus and decoupling and isolating at least some of said port terminals of said first computer from said second computer when said first computer is disconnected from said SCSI bus or powered-down, said switching circuit receiving a termination power voltage from said bus and selectively providing electrical termination of said SCSI bus.

7. A clustered computer system comprising:
    a first server computer at a first node;
    a second server computer at a second node;
    a plurality of hard disk drives for storing data;
    a Small Computer System Interface (SCSI) bus coupling said first server said second server, and said plurality of disk drives; and
    a bus switching circuit interposed on said SCSI bus between said first computer and said plurality of disk drives for automatically terminating said SCSI bus and isolating said first server computer from said second computer when said first computer is disconnected from said SCSI bus or powered-down, said bus switching circuit receiving a termination power voltage from said bus and selectively providing electrical termination of said SCSI bus; said bus switching circuit further comprising:
        a first input/output port having a plurality of first port terminals;
        a second input/output port having a plurality of second port terminals;
        a terminator circuit having predetermined electrical characteristics,
        a reference voltage generator for generating a reference voltage;

a voltage comparator circuit for comparing a termination power (TERM PWR) voltage received over said SCSI bus from a first side of said SCSI bus with said reference voltage and for generating a switch control signal having a first state when said first voltage has a predetermined magnitude relationship relative to said reference voltage; and a multi-pole switch for coupling said first port terminals to said terminator circuit in response to receipt of said first state of said switch control signal and for coupling said first port terminals to said second port terminals in response to receipt of another state of said switch control signal.

8. A Small Computer System Interface (SCSI) bus switching circuit comprising:

a first multi-line SCSI input/output port having a plurality of first port terminals;

a second multi-line SCSI input/output port having a plurality of second port terminals;

a bus termination circuit coupled to and receiving a termination power voltage from a first side of said bus and selectively providing electrical termination of said SCSI bus;

a reference voltage generator for generating a reference voltage;

a voltage comparator circuit for comparing a termination power (TERM PWR) voltage received over said SCSI bus from a first side of said SCSI buss with said reference voltage and for generating switch control signals having a first state when said first voltage has a predetermined magnitude relationship relative to said reference voltage;

a plurality of individual field-effect transistors (FETs), each responsive to said switch control signals to couple one of said first port terminal lines of said multi-line SCSI bus to either said second port terminals or said terminator circuit, said coupling to said terminator circuit including decoupling said first port terminals from said second port terminals to automatically isolate said multiline SCSI bus within a isolation time of between substantially 1 nanosecond and substantially 50 nanoseconds, said FETs coupling said first port terminals to said bus termination circuit in response to receipt of said first state of said switch control signals and for coupling said first port terminals to said second port terminals in response to receipt of another state of said switch control signal; and said bus termination circuit provides automatic termination on said SCSI bus when a SCSI device connected to said second input/output port loses power, is powered-down, or becomes disconnected from the SCSI bus.

9. A switching circuit as in claim 8, wherein: said second port is connected to a server node via said SCSI bus, said first input/output port is coupled to other SCSI devices, and said circuit provides complete electrical isolation of said server node from said other SCSI devices when said server node loses power, is powered-down, or becomes disconnected from the SCSI bus.

10. In a Small Computer System Interface (SCSI) bus based computer system, a method for bus switching comprising steps of:

coupling a terminator circuit to and receiving a termination power voltage from a first side of said bus and selectively providing electrical termination of said SCSI bus;

generating a reference voltage;

comparing a said termination power voltage received over said SCSI bus from a first side of said SCSI bus with said generated reference voltage;

generating switch control signals having a first state when said first voltage has a predetermined magnitude relationship relative to said reference voltage; and receiving said control signals by a plurality of transistor switches and selectively coupling said first port terminals to said terminator circuit and decoupling said first port terminals from said second port terminals to isolate said first port terminals from said second port terminals in response to receipt of said first state of said switch control signal and coupling said first port terminals to said second port terminals in response to receipt of second state of said switch control signals.

11. A Small Computer System Interface (SCSI) bus switching circuit comprising:

a first SCSI input/output port having a plurality of first port terminals;

a second SCSI input/output port having a plurality of second port terminals;

a terminator circuit coupled to and receiving a termination power (TERM PWR) voltage from a first side of said buss and selectively providing electrical termination of said SCSI bus;

a reference voltage generator for generating a reference voltage;

a voltage comparator circuit for comparing a termination power (TERM PWR) voltage received over said SCSI bus from a first side of said SCSI bus with said reference voltage and for generating a switch control signal having a first state when said first voltage has a predetermined magnitude relationship relative to said reference voltage;

a first multi-pole switch for coupling said first port terminals to said terminator circuit and decoupling said first port terminals from said second port terminals to isolate said first port terminals from said second port terminals in response to receipt of said first state of said switch control signal; and a second multi-pole switch for coupling said first port terminals to said second port terminals in response to receipt of another state of said switch control signal.

12. A bus switching circuit as in claim 11, wherein:

said first input/output port comprises a Small Computer System Interface (SCSI) connector adapted to couple to a multi-line SCSI bus;

said second input/output port comprises a SCSI connector adapted to couple to a multi-line SCSI bus;

said terminator circuit has electrical characteristics that provide electrical termination of said SCSI bus;

said first voltage is the SCSI term power voltage received over said SCSI bus, said reference voltage is a voltage less than said SCSI term power standard SCSI compliant term voltage, and said voltage comparator circuit predetermined magnitude relationship is that said first voltage is a predetermined amount less than said reference voltage; and each said multi-pole switch comprising a plurality of individual electronic transistor switches, each responsive to said switch control signal to couple one of said first port terminal lines of said multi-line SCSI bus to either said terminator circuit to automatically isolate said multi-line SCSI bus or said second port terminals.

13. A bus switching circuit as in claim 12, wherein: said multi-pole switch comprises a plurality of Field Effect Transistors (FETs) simultaneously responding to said switch control signal to switch in a period of time between substantially 1 nanosecond and substantially 50 nanoseconds.

14. A bus switching circuit as in claim 12, wherein:
said terminator circuit provides automatic termination on said SCSI bus when a SCSI device connected to said second input/output port loses power, is powered-down, or becomes disconnected from the SCSI bus.

15. A bus switching circuit as in claim 12, wherein: said second port is connected to a server node via said SCSI bus, said first input/output port is coupled to other SCSI devices, and said circuit provides complete electrical isolation of said server node from said other SCSI devices when said server node loses power, is powered-down, or becomes disconnected from the SCSI bus.

* * * * *